(12) United States Patent  
Cheng et al.

(10) Patent No.: US 11,308,912 B2  
(45) Date of Patent: Apr. 19, 2022

(54) GATE DRIVE CIRCUIT FOR IMPROVING CHARGING EFFICIENCY OF DISPLAY PANEL, DISPLAY MODULE AND DISPLAY DEVICE

(71) Applicants: BEIHAI HKC OPTOELECTRONICS TECHNOLOGY CO., LTD., Guangxi (CN); HKC CORPORATION LIMITED, Guangdong (CN)

(72) Inventors: Chiayang Cheng, Guangxi (CN); Chongwei Tang, Guangxi (CN)

(73) Assignees: BEIHAI HKC OPTOELECTRONICS TECHNOLOGY CO., LTD., Beihai (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/164,068

(22) Filed: Feb. 1, 2021

(65) Prior Publication Data

US 2022/0036849 A1   Feb. 3, 2022

(30) Foreign Application Priority Data

Jul. 28, 2020 (CN) .......................... 202010740657.7

(51) Int. Cl.
*G09G 3/36* (2006.01)
*G09G 5/18* (2006.01)
*G02F 1/1362* (2006.01)

(52) U.S. Cl.
CPC ..... *G09G 3/3688* (2013.01); *G02F 1/136286* (2013.01); *G09G 2310/0272* (2013.01); *G09G 2310/08* (2013.01)

(58) Field of Classification Search
CPC ......... G09G 3/3688; G09G 2310/0272; G09G 2310/08; G02F 1/136286
See application file for complete search history.

(56) References Cited

U.S. PATENT DOCUMENTS

2010/0245301 A1 * 9/2010 Shang .................... G11C 19/28  
345/204  
2016/0180817 A1 6/2016 Cho et al.  
(Continued)

FOREIGN PATENT DOCUMENTS

CN 111028758 A 4/2020  
TW 201514963 A 4/2015

OTHER PUBLICATIONS

The First Chinese Office Action dated Jul. 19, 2021; Appln. No. 202010740657.7.

*Primary Examiner* — Kwang-Su Yang

(74) *Attorney, Agent, or Firm* — Westbridge IP LLC

(57) ABSTRACT

A gate drive circuit includes: N array substrate row drive circuits arranged in cascade, an Nth array substrate row drive circuit is configured for outputting an Nth gate drive signal in response to a signal input terminal receiving a gate drive signal output by an N−1th array substrate row drive circuit to control Nth sub-pixels to charge; N auxiliary circuits, a timing signal input terminal is connected to an Nth timing control signal, a controlled terminal is connected to a pull-up control signal terminal of the N−1th array substrate row drive circuit, and an output terminal is connected to a gate drive signal output terminal; and the Nth auxiliary circuit is configured for controlling the Nth sub-pixels to charge in a determination that the Nth timing control signal connected to the timing signal input terminal and an N−1th pull-up control signal connected to the controlled terminal are both high level.

20 Claims, 6 Drawing Sheets

(56) References Cited

U.S. PATENT DOCUMENTS

2019/0333464 A1* 10/2019 Horiuchi .............. G09G 3/3677
2020/0044092 A1*  2/2020 Feng ................... H01L 27/1251
2021/0223902 A1*  7/2021 Wang ................... G06F 3/0416

\* cited by examiner

GATE DRIVE CIRCUIT FOR IMPROVING CHARGING EFFICIENCY OF DISPLAY PANEL, DISPLAY MODULE AND DISPLAY DEVICE

CROSS REFERENCE TO RELATED APPLICATIONS

The present disclosure claims the priority of Chinese Patent application with No. 202010740657.7, filed on Jul. 28, 2020 and entitled "Gate Drive Circuit, Display Module and Display Device", which is hereby incorporated by reference in its entirety.

TECHNICAL FIELD

The present disclosure relates to the field of liquid crystal display technology, in particular to a gate drive circuit, a display module and a display device.

BACKGROUND

In order to comply with the trend of the large-size and high-resolution Liquid Crystal Display Television (LCD TV), more and more LCD panels adopt narrow frame designs. A gate drive circuit is generally arranged at the side frame of the display panel, so that equal resistance setting wiring cannot be performed between each gate line and the gate driver, which is prone to uneven charging.

SUMMARY

The main object of the present disclosure is to provide a gate drive circuit, a display module and a display device, which aims to improve the picture quality of the display device.

To achieve the above object, the present disclosure provides a gate drive circuit, including:

N array substrate row drive circuits arranged in cascade, where each array substrate row drive circuit includes a signal input terminal, a pull-up control signal terminal and a gate drive signal output terminal, and an Nth array substrate row drive circuit is configured for outputting an Nth gate drive signal in response to a signal input terminal of the Nth array substrate row drive circuit receiving a gate drive signal output by an (N−1)th array substrate row drive circuit to control Nth sub-pixels to charge; and N auxiliary circuits, where each auxiliary circuit is arranged corresponding to one of the N array substrate row drive circuits, and each auxiliary circuit includes a timing signal input terminal, a controlled terminal and an output terminal;

where:

a timing signal input terminal of an Nth auxiliary circuit is connected to an Nth timing control signal, a controlled terminal of the Nth auxiliary circuit is connected to a pull-up control signal terminal of the (N−1)th array substrate row drive circuit, and an output terminal of the Nth auxiliary circuit is connected to a gate drive signal output terminal of the Nth array substrate row drive circuit; and the Nth auxiliary circuit is configured for controlling the Nth sub-pixels to charge in a determination that the Nth timing control signal connected to the timing signal input terminal of the Nth auxiliary circuit and an (N−1)th pull-up control signal connected to the controlled terminal of the Nth auxiliary circuit are both high level; wherein N is an integer greater than 1.

In an embodiment, each auxiliary circuit includes a first active switch, a controlled terminal of the first active switch is the controlled terminal of the each auxiliary circuit, an input terminal of the first active switch is the timing signal input terminal of the each auxiliary circuit, and an output terminal of the first active switch is the output terminal of the each auxiliary circuit.

In an embodiment, each array substrate row drive circuit includes a charge circuit, a reset circuit and an output circuit, an input terminal of the charge circuit is the signal input terminal of the each array substrate row drive circuit, an output terminal of the charge circuit is the pull-up control signal terminal of the each array substrate row drive circuit and is connected to a controlled terminal of the output circuit, an input terminal of the output circuit is connected to a timing signal for the each array substrate row drive circuit, and an output terminal of the output circuit is the gate drive signal output terminal of the each array substrate row drive circuit.

The present disclosure further provides a display module, which includes:

a display panel; and the gate drive circuit as described above, where the N array substrate row drive circuits arranged in cascade and the N auxiliary circuits are correspondingly arranged on at least one side of the display panel.

In an embodiment, each auxiliary circuit includes a first active switch, a controlled terminal of the first active switch is the controlled terminal of the each auxiliary circuit, an input terminal of the first active switch is the timing signal input terminal of the each auxiliary circuit, and an output terminal of the first active switch is the output terminal of the each auxiliary circuit.

In an embodiment, each array substrate row drive circuit includes a charge circuit, a reset circuit and an output circuit, an input terminal of the charge circuit is the signal input terminal of the each array substrate row drive circuit, an output terminal of the charge circuit is the pull-up control signal terminal of the each array substrate row drive circuit and is connected to a controlled terminal of the output circuit, an input terminal of the output circuit is connected to a timing signal for the each array substrate row drive circuit, and an output terminal of the output circuit is the gate drive signal output terminal of the each array substrate row drive circuit.

In an embodiment, the display module includes a first side and a second side arranged oppositely;

where the N array substrate row drive circuits arranged in cascade and the N auxiliary circuits are both arranged on the first side and the second side.

In an embodiment, the display panel includes:

a pixel array, including odd-numbered rows of sub-pixels and even-numbered rows of sub-pixels;

where:

each odd-numbered row of sub-pixels is connected to one of the N array substrate row drive circuits arranged on the first side and one of the N auxiliary circuits arranged on the second side; and each even-numbered row of sub-pixels is connected to one of the N array substrate row drive circuits arranged on the second side and one of the N auxiliary circuits arranged on the first side.

In an embodiment, the display module includes a first side and a second side arranged oppositely;

where:
the N array substrate row drive circuits arranged in cascade are all arranged on the first side; and
the N auxiliary circuits are all arranged on the second side.

In an embodiment, the display panel includes:
a pixel array, including N rows of sub-pixels, where each row of sub-pixels is connected to one of the N array substrate row drive circuits and one of the N auxiliary circuits.

In an embodiment, the pixel array includes a plurality of sub-pixels, each sub-pixel includes three sub-pixels (red, green, and blue), gates of sub-pixels located in a same row are connected to an array substrate row drive circuit of a same level through a gate line, and sources of sub-pixels located in a same column are connected to the source drive circuit through one of the data lines.

In an embodiment, the display module further includes a source drive circuit and data lines, and output terminals of the source drive circuit are connected to the pixel array of the display panel through the data lines.

In an embodiment, the display module further includes a timing controller and a driving power supply, where the timing controller is connected to the source drive circuit, and an output terminal of the driving power supply is connected to the N array substrate row drive circuits and the source drive circuit.

In an embodiment, the display panel further includes:
a first substrate, including a display area and a non-display area, where the pixel array is arranged in the display area of the first substrate, and the N array substrate row drive circuits arranged in cascade and the N auxiliary circuits are arranged in the non-display area of the first substrate;
a second substrate, arranged opposite to the first substrate; and
a liquid crystal layer, arranged between the first substrate and the second substrate and including liquid crystal molecules, where the pixel array is configured for controlling actions of the liquid crystal molecules.

In an embodiment, the display panel further includes a sealant arranged in a non-display area between the first substrate and the second substrate and surrounding the liquid crystal layer, where the N array substrate row drive circuits are located between the sealant and the display area.

In an embodiment, the sealant is coated on the first substrate or the second substrate.

In an embodiment, the first substrate and the second substrate are both glass substrates or plastic substrates.

In an embodiment, the first substrate is an array substrate, and the second substrate is a color filter substrate.

The present disclosure further provides a display device, which includes the gate drive circuit as described above.

The present disclosure further provides a display device, which includes the display module as described above.

According to the present disclosure, the gate drive circuit includes N array substrate row drive circuits arranged in cascade, and N auxiliary circuits arranged corresponding to the N array substrate row drive circuits. An Nth array substrate row drive circuit is configured for outputting an Nth gate drive signal in response to a signal input terminal of the Nth array substrate row drive circuit receiving a gate drive signal output by an (N−1)th array substrate row drive circuit to control Nth sub-pixels to charge. An Nth auxiliary circuit is configured for controlling the Nth sub-pixels to charge in a determination that the Nth timing control signal connected to the timing signal input terminal Ck(n)' of the Nth auxiliary circuit and an (N−1)th pull-up control signal connected to the controlled terminal of the Nth auxiliary circuit are both high level. According to the present disclosure, uneven wiring of the display panel can lead to uneven charging of near-end and far-end sub-pixels in an Nth row. In addition, since the array substrate row drive circuits of each level are separately arranged on both sides of the display panel, the gate drive signals output by an upper-level array substrate row drive circuit need to pass through a longer wiring to be output to a next-level array substrate row drive circuit, resulting in unsaturated charging voltage of the rows of sub-pixels. The present disclosure simultaneously charges the sub-pixels at the same level through N auxiliary circuits and N array substrate row drive circuits arranged in cascade to compensate for the above mentioned uneven charging of near-end and far-end sub-pixels in an Nth row and unsaturated charging voltage of each row of sub-pixels. The present disclosure designs the waveform of the gate drive signal through the N array substrate row drive circuits and the N auxiliary circuits, so as to ensure that each sub-pixel on each row is fully charged, which is beneficial for each sub-pixel to have the same charging effect and consistent brightness. The present disclosure solves the problem of low grayscale bright and dark lines caused by differences in charging saturation between sub-pixels, or poor saturation of the entire display panel due to uneven wiring or excessively long wiring The present disclosure improves picture quality of the display device.

BRIEF DESCRIPTION OF THE DRAWINGS

In order to more clearly describe the technical solutions in the embodiments of this disclosure or the related art, the following will briefly introduce the drawings that need to be used in the description of the embodiments or the related art. Obviously, the drawings in the following description are only some embodiments of this disclosure. For those of ordinary skill in the art, without creative work, other drawings can be obtained according to the structures shown in these drawings.

Figure 1:
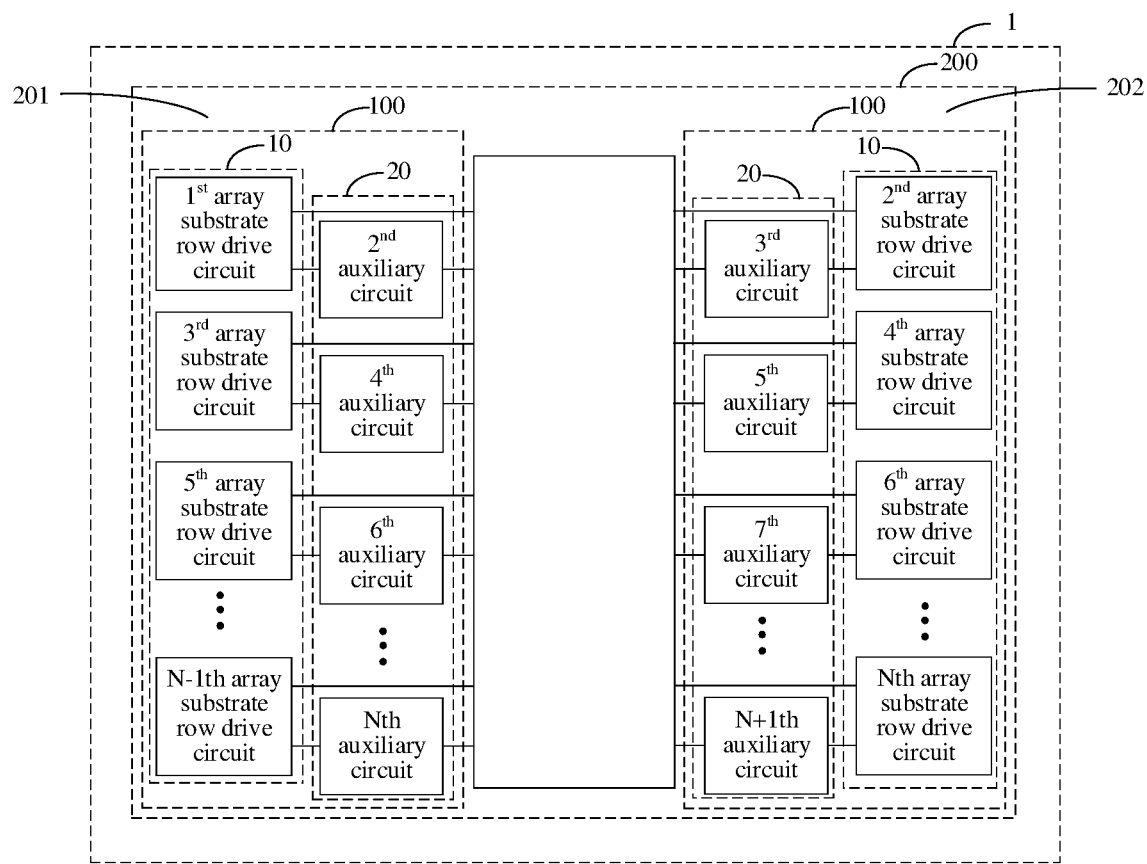
FIG. 1 is a schematic diagram of functional modules of a gate drive circuit applied to a display module according to an embodiment of the present disclosure.

The realization of the object, functional characteristics, and advantages of this disclosure will be further described in conjunction with the embodiments and with reference to the accompanying drawings.

DETAILED DESCRIPTION OF THE EMBODIMENTS

The technical solutions in the embodiments of this disclosure will be described clearly and completely in conjunction with the drawings in the embodiments of this disclosure. Obviously, the described embodiments are only a part of the embodiments of this disclosure, but not all the embodiments. Based on the embodiments in this disclosure, all other embodiments obtained by those of ordinary skill in the art without making creative efforts fall within the protection scope of this disclosure.

It should be noted that if there is a directional indication (such as up, down, left, right, front, back . . . ) in the embodiment of this disclosure, the directional indication is only used to explain the relative positional relationship, movement conditions, etc. among the components in a specific posture (as shown in the drawings), if the specific posture changes, the directional indicator also changes accordingly.

In addition, if there are descriptions related to "first", "second", etc. in the embodiments of this disclosure, the descriptions of "first", "second", etc. are for descriptive purposes only, and cannot be understood as indicating or implying their relative importance or implicitly indicating the number of indicated technical features. Thus, the features defined as "first" and "second" may include at least one of the features either explicitly or implicitly. In addition, the technical solutions between the various embodiments can be combined with each other, but they must be based on the ability of those skilled in the art to realize. When the combination of technical solutions conflicts with each other or cannot be realized, it should be considered that the combination of such technical solutions does not exist, nor within the scope of protection required by this disclosure.

The present disclosure provides a gate drive circuit, which is applied to display devices with display panels such as mobile phones, computers, and televisions.

Display panels can be divided into a System on Chip (SOC) type and a Gate Driver on Array (GOA) type according to gate driver design. GOA is a process technology that directly manufactures the gate driver IC on the array substrate of the display device to replace the drive chip made by an external silicon chip. The application of this technology can reduce production process procedures, reduce product process costs, and improve the integration of display panels. With the development of LCD TVs and computer display screens toward super-large size and high resolution, more and more liquid crystal display panels adopt a narrow frame design to increase the display area of the display screen.

The GOA is generally arranged at the side frame of the display panel, and the gate row scanning drive signal circuit is fabricated on the array substrate of the display panel by using the thin film transistor (TFT) liquid crystal display array process to realize the progressive scanning of the gate. The driving method has the advantages of reducing production costs and realizing the narrow frame design of the panel, and is used by a variety of displays. In an exemplary architecture of the GOA display panel, Liquid Crystal (LC) molecules are filled between the upper and lower glass substrates and the surroundings are sealed with a sealing material. The liquid crystal is a polymer material and are widely used in thin and light display technology because of its special physical, chemical and optical properties.

Depending on the size of the display panel, the GOA circuit can be arranged on one side of the display panel or on both sides of the display panel. When arranged on both sides of the display panel, the GOA circuits on both sides can drive one row of sub-pixels to be turned on at the same time, or alternately control rows of sub-pixels to be turned on.

In some large-size display panels, because the gate line resistance of the panel away from the gate drive area is not uniform with that near the gate drive area, that is, for the TFT array near the gate driver, the gate line wiring therebetween is relatively short, and for the TFT array away from the gate driver, the gate line wiring therebetween is relatively long. According to the resistance calculation formula R=ρL/S, it can be seen that for the wirings with the same cross-sectional area, the longer the length of the wiring, the greater the resistance, and vice versa (where R represents resistance of wiring, S represents cross-sectional area of wiring, L represents length of wiring, and ρ represents resistivity of wiring). The sub-pixels in the same row are turned on at the same time, while time of the data signal being output to each of the sub-pixels is the same, it will inevitably lead to uneven charge of the area of the panel far from the gate drive and the area of the panel close to the gate drive, resulting in uneven brightness of the display panel. Therefore, gate drivers are often provided on left and right sides of the display panel, and frame start signal Start Vertical (STV), scan clock pulse signal Clock Pulse Vertical (CPV), clock signals CK1~CKx, low-frequency signals LC1&LC2 and other GOA drive signals are output through the timing controller to the GOA circuits on the left and right sides of the panel. After the GOA circuits operate normally, the gate lines in the display panel are turned on row by row to realize bilateral drive.

While in some relatively small display panels, GOA circuits arranged on opposite sides of the display panel can alternately control each row of sub-pixels to be turned on. For example, GOA circuits arranged on one side of the display panel control sub-pixels in odd rows to be turned on, and the GOA circuits arranged on the other side of the display panel control the sub-pixels in the even rows to be turned on, so as to realize the interleaved single drive. Or the GOA circuits arranged on one side of the display panel controls the sub-pixels to be turned on row by row to realize unilateral driving. Since the GOA circuit is arranged on the side frame of the display panel, the brightness of the display area close to the gate driver is greater than that of the display area far away from the gate driver, resulting in uneven brightness due to uneven charging of the area of the panel away from the gate driver (hereinafter referred to as the far end) and the area of the panel close to the gate driver (hereinafter referred to as the near end). In addition, for each level of GOA circuit in the GOA circuits, the output signal (gate-on signal) output by a current row is not only output for driving the sub-pixels of the current row, but also acts as a reset signal of a previous row and an input signal of a next row. So, in the interleaved single drive, the reset signal for the previous row and the input signal for the next row in the GOA circuits are on the opposite side of the display panel. This makes it necessary to lay longer wirings, which easily reduces the charging efficiency of the display panel.

In order to solve the above-mentioned problems, referring to FIGS. 1 to 7, the present disclosure provides a new gate drive circuit 100. In an embodiment of the present disclosure, the gate drive circuit 100 includes:

N array substrate row drive circuits 10 arranged in cascade, where each array substrate row drive circuit 10 includes a signal input terminal S(n−1), a pull-up control signal terminal Q(n) and a gate drive signal output terminal G(n), N auxiliary circuits 20, where each auxiliary circuit 20 is arranged corresponding to one of the N array substrate row drive circuits 10, and each auxiliary circuit 20 includes a timing signal input terminal Ck(n)', a controlled terminal Q(n−1)' and an output terminal G(n)'; where, a timing signal input terminal Ck(n)' of an Nth auxiliary circuit 20 is connected to an Nth timing control signal CK(n), a controlled terminal Q(n−1)' of the Nth auxiliary circuit 20 is connected to a pull-up control signal terminal Q(n−1) of the N4th (N−1)th array substrate row drive circuit 10, and an output terminal G(n)' of the Nth auxiliary circuit 20 is connected to a gate drive signal output terminal G(n) of the Nth array substrate row drive circuit 10; and where, an Nth array substrate row drive circuit 10 is configured for outputting an Nth gate drive signal in response to a signal input terminal S(n−1) of the Nth array substrate row drive circuit receiving a gate drive signal output by an N4th (N−1)th array substrate row drive circuit 10 to control Nth sub-pixels PX(n) to charge; and the Nth auxiliary circuit 20 is configured for controlling the Nth sub-pixels PX(n) to charge in a determination that the Nth timing control signal connected to the timing signal input terminal Ck(n)' of the Nth auxiliary circuit 20 and an N4th (N−1)th pull-up control signal connected to the controlled terminal Q(n−1)' of the Nth auxiliary circuit are both high level.

In this embodiment, the display panel has a display area and a non-display area, and each cascaded array substrate row drive circuit 10 is arranged in the non-display area, and the non-display area can be arranged on one or both sides according to the size of the display panel. In this embodiment, the non-display area is arranged on both sides of the display panel. In order to improve the charging efficiency of the display panel and to quickly complete the charging of the pixels, each array substrate row drive circuit 10 can enable the precharging function, so that the signal of the subsequent array substrate row drive circuit 10 is turned on in advance, and the pixel voltage of the row is adjusted in advance to convert towards the target polarity voltage of the current frame.

Each array substrate row drive circuit 10 is arranged in cascade, and each array substrate row drive circuit 10 is usually provided with a charging unit, an output unit, and the like. The charging unit receives the gate drive signal output by the upper-level array substrate row drive circuit 10 and outputs a pull-up control signal. The output unit is turned on in response to receiving the pull-up control signal, and outputs a high level timing signal as a gate drive signal of the sub-pixels at the current level in a determination that a timing signal input by the timing signal input terminal is at a high level. In the entire array substrate row drive circuits 10, an input signal of a first array substrate row drive circuit 10 is a frame start signal STV, and input signals of a second to Nth array substrate row drive circuits 10 are provided by an output signal of an upper-level array substrate row drive circuit 10. Each array substrate row drive circuit 10 is usually provided with a capacitor and will output a pull-up control signal before it is turned on to precharge the capacitor, the array substrate row drive circuit 10 is turned on until the timing signal is at a high level, so as to drive TFTs of the corresponding row of sub-pixels to turn on, and control the Nth sub-pixels PX(n) to charge.

A controlled terminal of each auxiliary circuit 20 is connected to a pull-up control signal terminal of an upper-level array substrate row drive circuit 10, and in a determination that the pull-up control signal output from the pull-up control signal terminal of the upper-level array substrate row drive circuit 10 is at a high level, the auxiliary circuit 20 is turned on to control the Nth sub-pixels PX(n) to charge.

Figure 2:
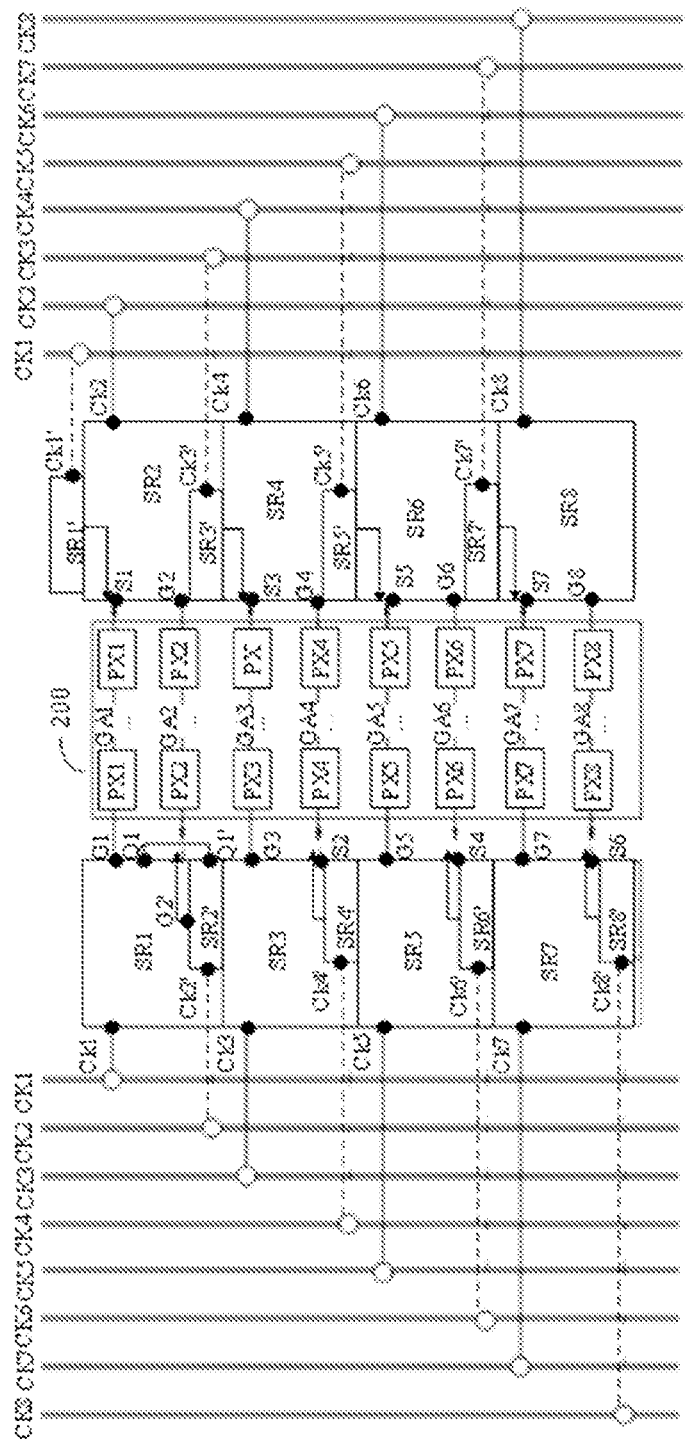
FIG. 2 is a schematic diagram of a circuit structure of the gate drive circuit applied to the display module according to an embodiment of the present disclosure.

Specifically, referring to FIG. 2, this embodiment takes the Nth row of sub-pixels (where N is greater than or equal to 2) in combination with the Nth array substrate row drive circuit 10 and the Nth auxiliary circuit 20 corresponding to the Nth row of sub-pixels, the change of the data voltage polarity of the Nth row of sub-pixels, and the output diagrams of each timing signal and data signal as an example for description. In an embodiment, N is taken as 8, and the 8-level auxiliary circuits are respectively labeled SR1', SR2', SR3', SR4', SR5', SR6', SR7', and SR8'. The 8-level array substrate row drive circuits are respectively labeled SR1, SR2, SR3, SR4, SR5, SR6, SR7, and SR8. The 8-level auxiliary circuit and the 8-level array substrate row drive circuit are respectively connected to the display panel 200 through gate lines G1 to G8.

In the array substrate row drive circuit 10 corresponding to the Nth row of sub-pixels PX(n), a signal input terminal S(n−1) of the Nth array substrate row drive circuit 10 receives the gate drive signal output by the (N−1)th array substrate row drive circuit 10, a timing signal input terminal Ck(n)' of the Nth auxiliary circuit 20 receives an Nth timing signal CK(n), and a controlled terminal Q(n−1)' of the Nth auxiliary circuit 20 receives a pull-up control signal Qs(n−1) output by a pull-up control signal terminal Q(n−1) of the N4th (N−1)th array substrate row drive circuit 10. The Nth auxiliary circuit 20 and the Nth array substrate row drive circuit 10 are all triggered at high level, that is, both the Nth auxiliary circuit 20 and the Nth array substrate row drive circuit 10 are working at high level, and stops working at low level. The high-level pull-up control signals between the (N−1)th array substrate row drive circuit 10 and the Nth array substrate row drive circuit 10 usually differ by half a cycle, that is, after the high-level pull-up control signal of the (N−1)th array substrate row drive circuit 10 is maintained for half a period, the pull-up control signal of the Nth array substrate row drive circuit 10 also jumps to a high level.

When the (N−1)th array substrate row drive circuit 10 is charging the (N−1)th row of sub-pixels PX(n−1), the gate drive signal G(n−1) of the (N−1)th array substrate row drive circuit 10 is at a high level, and triggers the operation of the Nth array substrate row drive circuit 10 at the same time. When the timing control signal CK(n) of the Nth array substrate row drive circuit 10 is at a high level, the Nth array substrate row drive circuit 10 outputs a high-level gate drive signal to the Nth row of sub-pixels PX(n), thereby driving the Nth row of sub-pixels PX(n) to begin to precharge. Before the N−4th (N−1)th array substrate row drive circuit 10 charges the N4th (N−1)th row of sub-pixels PX(n−1), a charging unit of the N4th (N−1)th array substrate row drive circuit 10 outputs a pull-up control signal Qs(n−1) to an output unit of the Nth array substrate row drive circuit 10 and a controlled terminal Q(n−1)' of the Nth auxiliary circuit 20. The Nth auxiliary circuit 20 is turned on in response to receiving the pull-up control signal Qs(n−1), and controls the Nth sub-pixels PX(n) to turn on and charge in a determination that the timing signal CK(n) corresponding to the Nth array substrate row drive circuit 10 is at a high level. At this time, since the gate drive signal of the Nth array substrate row drive circuit 10 is output to the charging unit of the Nth array substrate row drive circuit 10, the charging unit outputs a high-level pull-up control signal to trigger the output unit to turn on. At this time, the Nth timing signal is at a high level, so that the timing signal is taken as a gate drive signal to control the Nth sub-pixels PX(n) to turn on and charge. The Nth auxiliary circuit 20 and the Nth array substrate row drive circuit 10 can simultaneously output high-level timing signals as gate drive signals to the Nth sub-pixels PX(n), thereby forming a new type of bilateral drive architecture. That is, when the Nth array substrate row drive circuit 10 control the near end Nth sub-pixels PX(n) to charge, the Nth auxiliary circuit 20 can control the far end Nth sub-pixels PX(n) to charge, so as to compensate for the voltage consumed by the wiring of the remote end sub-pixels. That is, to compensate for the unsaturated voltage of the remote end sub-pixels of the Nth sub-pixels PX(n) caused by too long gate line wiring and too long input signal wiring in the interleaved single-drive architecture.

It is understandable that in the display panel, since the capacity of the energy storage capacitor of the sub-pixel is constant, the sum of the pre-charging and charging is equal to the sum of its capacity, when the capacitor is filled to its maximum capacitance value, the voltage at both ends of the sub-pixel energy storage capacitor will remain stable and unchanged when it is filled. That is, the auxiliary circuit 20 can compensate the charging voltage consumed by the sub-pixels with longer wirings due to the excessively long wirings, and increase the charging saturation rate of the sub-pixels, while for the sub-pixels with shorter wirings, the voltage compensation of the auxiliary circuit 20 can increase the charging rate of each sub-pixel without affecting its charging saturation rate.

According to the present disclosure, the gate drive circuit 10 includes N array substrate row drive circuits 10 arranged in cascade, and N auxiliary circuits 20 arranged corresponding to the N array substrate row drive circuits. An Nth array substrate row drive circuit 10 is configured for outputting an Nth gate drive signal Gs(n) in response to a signal input terminal S(n−1) of the Nth array substrate row drive circuit 10 receiving a gate drive signal Gs(n−1) output by an (N−1)th array substrate row drive circuit 10 to control Nth sub-pixels PX(n) to charge. An Nth auxiliary circuit 20 is configured for controlling the Nth sub-pixel PX(n) to charge in a determination that the Nth timing control signal CK(n) connected to the timing signal input terminal Ck(n)' of the Nth auxiliary circuit 20 and an (N−1)th pull-up control signal Qs(n−1) connected to the controlled terminal Q(n−1)' of the Nth auxiliary circuit 20 are both high level. The present disclosure simultaneously charges the sub-pixels at the same level through the N auxiliary circuits 20 and the N array substrate row drive circuits 10 arranged in cascade, so as to realize voltage compensation for the remote end sub-pixels, thereby compensating the uneven charging of near-end and far-end sub-pixels of the Nth rows of sub-pixels PX(n) due to uneven wiring of the display panel, and to compensate for unsaturated charging voltage of each row of sub-pixels because the array substrate row drive circuits of each level are separately arranged on both sides of the display panel, the gate drive signals output by an upper-level array substrate row drive circuit need to pass through a longer wiring to be output to a next-level array substrate row drive circuit. The present disclosure designs the waveform of the gate drive signal through the N array substrate row drive circuits 10 and the N auxiliary circuits 10, so as to ensure that each sub-pixel on each row is fully charged, which is beneficial for each sub-pixel to have the same charging effect and consistent brightness. The present disclosure solves the problem of low grayscale bright and dark lines caused by differences in charging saturation between sub-pixels, or poor saturation of the entire display panel due to uneven wiring or excessively long wiring The present disclosure improves picture quality of the display device.

Figure 4:
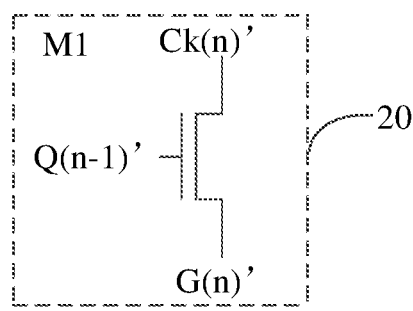
FIG. 4 is a schematic diagram of a circuit structure of auxiliary circuits in the gate drive circuit according to an embodiment of the present disclosure.

Referring to FIG. 4, in an embodiment, each auxiliary circuit 20 includes a first active switch M1, a controlled terminal of the first active switch M1 is the controlled terminal Q(n−1)' of the each auxiliary circuit 20, an input terminal of the first active switch M1 is the timing signal input terminal Ck(n)' of the each auxiliary circuit 20, and an output terminal of the first active switch M1 is the output terminal G(n)' of the each auxiliary circuit 20.

Figure 8:
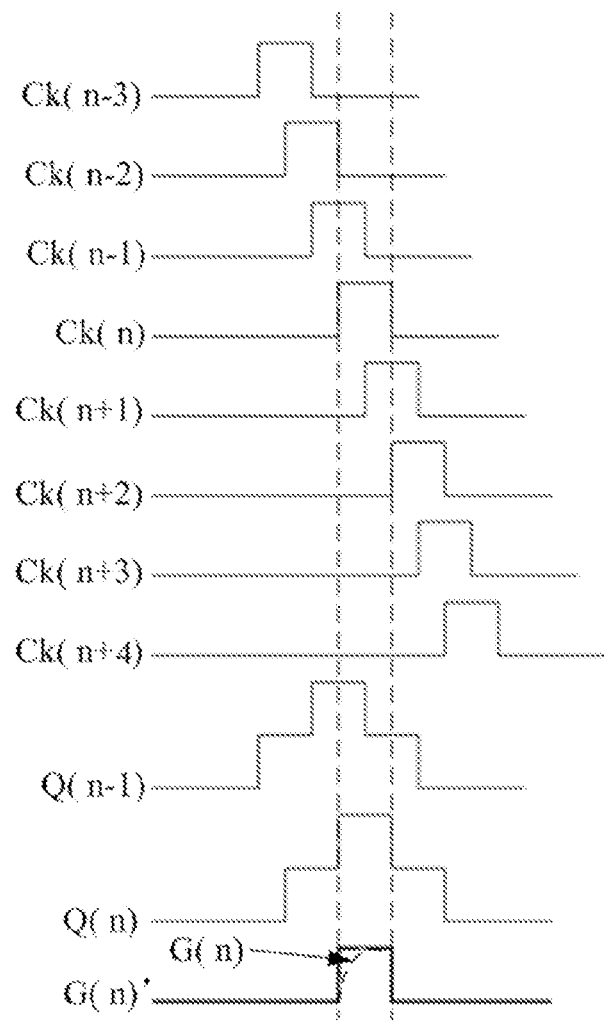
FIG. 8 is a timing diagram of the gate drive circuit according to an embodiment of the present disclosure.

In this embodiment, the first active switch M1 can optionally be configured as an N-type TFT, which is turned on at a high level. In this embodiment, the first active switch M1 is controlled based on the pull-up control signal Qs(n−1) of the (N−1)th array substrate row drive circuit 10. In a determination that the pull-up control signal Qs(n−1) of the (N−1)th array substrate row drive circuit 10 is at a high level, the first active switch M1 is turned on and outputs a high-level Nth timing signal CK(n) to the Nth sub-pixels PX(n), where the high-level Nth timing signal CK(n) is taken as the gate drive signal of the Nth sub-pixels PX(n) and drives the Nth sub-pixels PX(n) to charge. Referring to FIG. 8, a waveform of Gs(n) is an uncompensated gate drive signal, and a waveform of Gs(n)' is a compensated gate drive signal. It can be seen that when the Nth array substrate row drive circuit 10 outputs the gate drive signal to the Nth sub-pixels PX(n) and drives the Nth sub-pixels PX(n) to charge, another gate drive signal is added to the Nth sub-pixels PX(n) through the Nth auxiliary circuit 20, so that the voltage applied to the gate terminals of the Nth sub-pixels PX(n) increases, thereby improving the driving ability of each TFT in the Nth sub-pixels PX(n), and the charging rate and saturation rate of the Nth sub-pixels PX(n).

Figure 3:
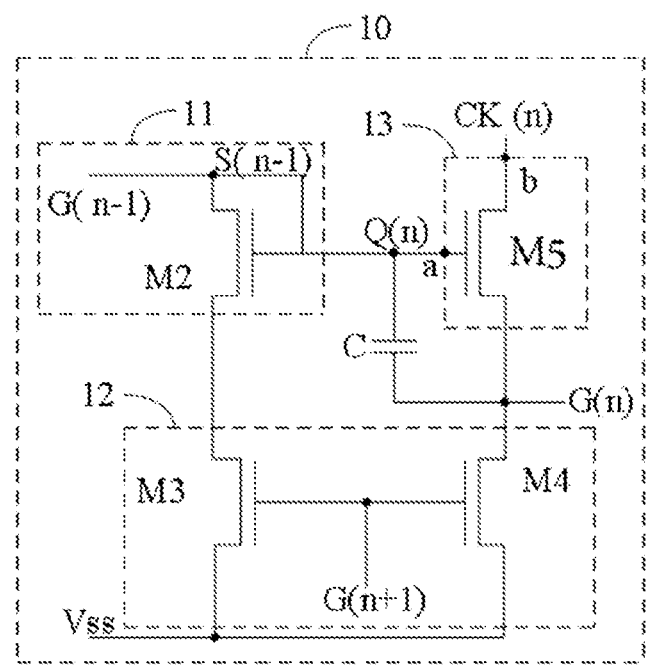
FIG. 3 is a schematic diagram of a circuit structure of array substrate row drive circuits in the gate drive circuit according to an embodiment of the present disclosure.

Referring to FIG. 3, in an embodiment, each array substrate row drive circuit 10 includes a charge circuit 11, a reset circuit 12 and an output circuit 13, an input terminal of the charge circuit 11 is the signal input terminal S(n−1) of the each array substrate row drive circuit 10, an output terminal of the charge circuit 11 is the pull-up control signal terminal Q(n) of the Nth array substrate row drive circuit 10 and is connected to a controlled terminal a of the output circuit 13, an input terminal b of the output circuit 13 is connected to a current-level timing signal CK(n), and an output terminal of the output circuit 13 is the gate drive signal output terminal G(n) of the each array substrate row drive circuit 10.

In this embodiment, the array substrate row drive circuit 10 can be a 4T1C unit architecture (that is, four TFTs and one capacitor C), or it can be a 8T1C unit architecture (that is, eight TFTs and one capacitor C). In this embodiment, a 4T1C unit architecture can be selected. Specifically, the charge circuit 11 includes a second active switch M2. An input terminal and a controlled terminal of the second active switch M2 are the input terminal of the charge circuit 11, and an output terminal of the second active switch M2 is the output terminal of the charge circuit 11. The reset circuit 12 includes a third active switch M3 and a fourth active switch M4, controlled terminals of the third active switch M3 and the fourth active switch M4 are connected to the gate drive signal output by the (N+1)th array substrate row drive circuit 10, input terminals of the third active switch M3 and the fourth active switch M4 are respectively connected to gate-off signals, an output terminal of the third active switch M3 is connected to the pull-up control signal terminal Q(n), and an output terminal of the fourth active switch M4 is connected to the gate drive signal output terminal G(n). The output circuit 13 includes a fifth active switch M5, a controlled terminal of the fifth active switch M5 is the controlled terminal of the output circuit 13, an input terminal of the fifth active switch M5 is the input terminal of the input circuit 13, and an output terminal of the fifth active switch M5 is the output terminal of the output circuit 13.

Each active switch can be implemented by a TFT, specifically, it can be implemented by a high-level conduction N-type TFT. In some embodiments, each array substrate row drive circuit 10 further includes a pull-down circuit (not shown in the figure) and a pull-down drive circuit (not shown in the figure). The pull-down circuit is configured for outputting a reset signal to the output terminal and controlled terminal of the output circuit 13 to control the output circuit 13 to stop working.

The input terminal of the output circuit 13 is connected to the pull-up control signal terminal output by the charge circuit 11, and is mainly configured for outputting the gate drive signal Gs(n) according to the pull-up control signal Qs(n). The reset circuit 12 is respectively connected to the controlled terminal of the output circuit 13 and the gate drive signal output terminal G(n). After the pixel circuit of the current row is scanned, the pull-up control signal Qs(n) and the gate scan signal Gs(n) are pulled down to low level. The array substrate row drive circuit 10 of this embodiment may be provided with a bootstrap capacitor, a first pole of the bootstrap capacitor is connected to the pull-up control signal terminal Q(n), and a second pole of the bootstrap capacitor is connected to the gate drive signal output terminal G(n) of the current level array substrate row drive circuit 10. The bootstrap capacitor C is configured for maintaining the voltage between the output circuits 13 and stabilize the output of the output circuit 13.

Before the output signal of the (N−1)th gate drive signal comes, Ck(n) is low, and the pull-up control signal terminal Q(n) is also low at this time, and the output circuit 13 has no signal output. When the output signal of the (N−1)th gate drive signal comes, the pull-up control signal terminal Q(n) is high, at this time Ck(n) is low, and the gate drive signal output terminal of the output circuit 13 outputs a low-level signal.

When the output signal of the (N−1)th gate drive signal comes, the pull-up control signal terminal is high, and Ck(n) is also high, the gate drive signal output terminal of the output circuit 13 outputs a high-level gate drive signal to turn on the TFTs corresponding to the Nth sub-pixels PX(n), thereby driving the Nth sub-pixels PX(n) to charge or precharge.

Since the pull-up control signal Qs(n) output by the Nth pull-up control signal terminal Q(n) simultaneously controls the operation of the (N+1)th auxiliary circuit 20, when the output signal of the gate drive signal of the (N−1)th comes, at this time, the pull-up control signal terminal Q(n) is high, and the (N+1)th stage auxiliary circuit 20 is turned on when receiving the high-level pull-up control signal Qs(n), and in a determination that the (N+1)th timing signal is at a high level, the (N+1)th stage auxiliary circuit 20 takes the high-level (N+1)th timing signal as the (N+1)th gate drive signal to drive the TFTs of the (N+1)th sub-pixels PX(n) to turn on to charge the sub-pixels. Since the gate drive signal Gs(n) of the Nth array substrate row drive circuit 10 is also the input signal of the (N+1)th stage array substrate row drive circuit 10, during the period when the output circuit 13 outputs the gate drive signal Gs(n), the (N+1)th array substrate row drive circuit 10 will also perform precharging, so that the (N+1)th auxiliary circuit 20 and the (N+1)th array substrate row drive circuit 10 will simultaneously control the far end and the near end (N+1)th sub-pixels PX(n+1) respectively, so that the conduction degree of the TFTs in the (N+1)th sub-pixels PX(n+1) can be increased, thereby increasing the charging rate and the charging saturation rate.

After outputting the high-level gate drive signal Gs(n+1), the (N+1)th array substrate row drive circuit 10 controls the active switch in the reset circuit 12 to turn on, so as to output a low-level pull-down control signal to the controlled terminal of the output circuit 13 and output a low-level gate drive signal (gate turn-off signal) to the (N+1)th sub-pixels to control the TFTs in the (N+1)th sub-pixels to turn off.

The present disclosure further provides a display module 1.

Figure 5:
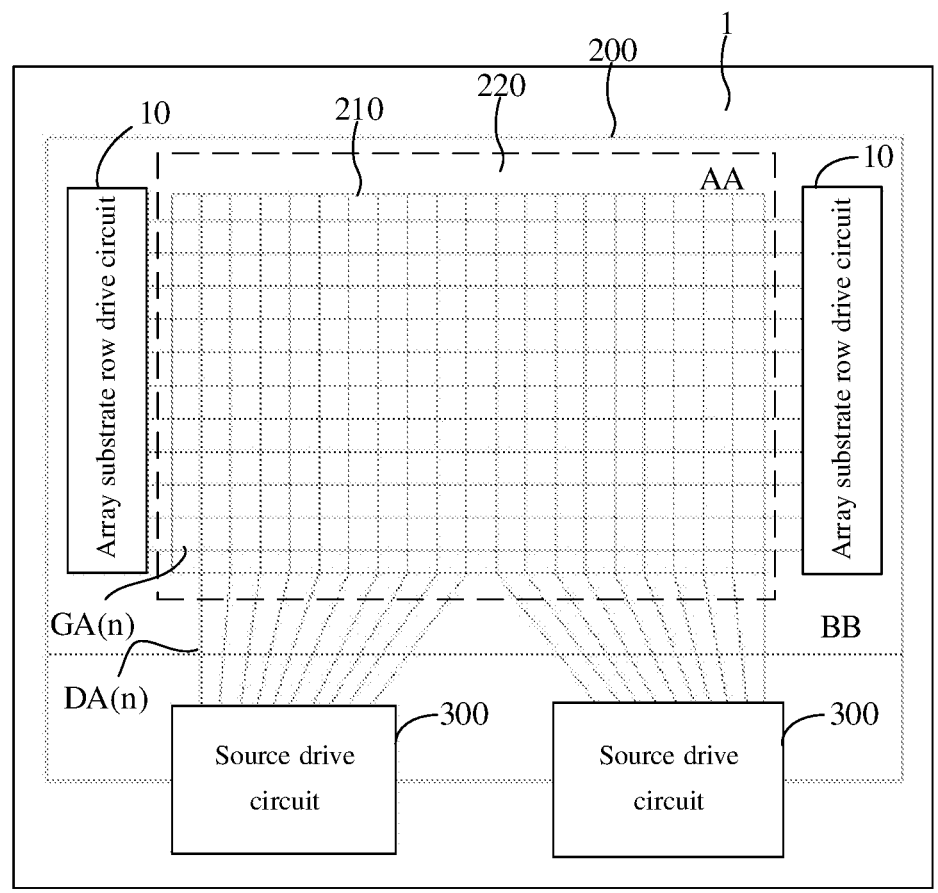
FIG. 5 is a schematic structural diagram of a display module according to an embodiment of the present disclosure.

Referring to FIG. 5 the display module 1 includes: a display panel 200 including two opposite sides and a pixel array 210; and the gate drive circuit as described above, where the N array substrate row drive circuits 10 arranged in cascade and the N auxiliary circuits 20 are correspondingly arranged on at least one side of the display panel.

In this embodiment, the display panel may be an Organic Light-Emitting Diode (OLED) display panel or a Thin Film Transistor Liquid Crystal Display (TFT-LCD) display panel.

In this embodiment, the display module further includes a source drive circuit 300 and data lines DA(n), and output terminals of the source drive circuit 300 are connected to input terminals of the pixel array 210 through the data lines DA(n).

The pixel array 210 of the display panel includes a plurality of sub-pixels, each sub-pixel includes three sub-pixels (red, green, and blue), gates of sub-pixels located in a same row are connected to an array substrate row drive circuit 10 of a same level through a gate line GA(n), and sources of sub-pixels located in a same column are connected to the source drive circuit 300 through one of the data lines DA(n).

In some embodiments, the display module 1 is further provided with a timing controller 400 and a driving power supply 500. The source drive circuit 300 is configured for inputting the data signal. The source drive circuit 300 is installed on the drive board PCB. The source drive circuit 300 is connected to the timing controller 400. Multiple output terminals of the source drive circuit 300 are respectively connected to corresponding data lines of the pixel array 210. The timing controller 400 receives data signal, control signal and clock signal output by external control circuits, such as a control system SOC of a television, and converts them into data signal, control signal and clock signal suitable for the array substrate drive circuit 10 and the source drive circuit 300. The source drive circuit 300 outputs the data signal to the corresponding pixels through the data lines to realize the image display of the display panel. There are multiple source drive circuits 300, which can be specifically set according to the size of the display panel. This embodiment takes two source drive circuits 300 as an example for description. An output terminal of the driving power supply 500 is connected to the array substrate row drive circuit 10 and the source drive circuit 300. The driving power supply 500 integrates multiple DC-DC conversion circuits with different circuit functions, and each conversion circuit has a different output voltage value. The input voltage of the input terminal of the driving power supply 500 is generally 5V or 12V, and the output voltage includes the working voltage DVDD provided to the timing controller 400 and the working voltage provided to the array substrate row drive circuit 10.

Referring to FIGS. 1 and 4, in an embodiment, the display panel 200 includes a first side 201 and a second side 202 arranged oppositely; and the N array substrate row drive circuits 10 arranged in cascade and the N auxiliary circuits 20 are both arranged on the first side and the second side.

In this embodiment, the array substrate row drive circuit 10 arranged on opposite sides of the display panel can alternately control each row of sub-pixels to be turned on. For example, the array substrate row drive circuit 10 arranged on one side of the display panel control sub-pixels in odd rows to be turned on, and the array substrate row drive circuit 10 arranged on the other side of the display panel control the sub-pixels in the even rows to be turned on, so as to realize the interleaved single drive.

Further, in the interleaved single drive display driving architecture, the display panel 200 includes:
- a pixel array 210, including odd-numbered rows of sub-pixels and even-numbered rows of sub-pixels;

where:
- each odd-numbered row of sub-pixels is connected to one of the N array substrate row drive circuits 10 arranged on the first side and one of the N auxiliary circuits 20 arranged on the second side; and
- each even-numbered row of sub-pixels is connected to one of the N array substrate row drive circuits 10 arranged on the second side and one of the N auxiliary circuits 20 arranged on the first side.

In this embodiment, the array substrate row drive circuits 10 and the auxiliary circuits 20 are arranged on both sides of the display panel. The array substrate row drive circuits 10 arranged on the first side can drive the odd-numbered rows of sub-pixels to operate, and the array substrate row drive circuits 10 arranged on the second side can drive the even-numbered rows of sub-pixels to operate. The odd-numbered rows of auxiliary circuits 20 are arranged on the second side, and the even-numbered rows of auxiliary circuit 20 are arranged on the first side, that is, the array substrate row drive circuit 10 and the auxiliary circuit 20 that drive the same row of sub-pixels are separately arranged on two sides of the display panel. In this way, when the row of sub-pixels is driven to work, the array substrate row drive circuit 10 can drive the near-end sub-pixels to charge, and the auxiliary circuit 20 located in the same row can drive the far-end sub-pixels to charge, so that the driving current can flow from two ends to the middle area to drive the entire row of sub-pixels to charge. Since the auxiliary circuit 20 can charge the far-end sub-pixels, it can compensate for the unsaturated charging voltage of the far-end sub-pixels due to insufficient driving force of the near-end array substrate row drive circuit 10, thereby ensuring that each sub-pixel can be fully charged. It is understandable that in a staggered single-drive display architecture, the array substrate row drive circuit 10 can be narrower in layout (double height can be used), and it is more suitable for use in narrow-frame panels, and it can be used in combination with the array substrate row drive circuit 10 and the auxiliary circuit 20 according to this embodiment to form a new type of dual drive and enhance the driving force for sub-pixels.

Referring to FIGS. 1 to 7, in an embodiment, the display panel 200 includes a first side and a second side arranged oppositely;

where:
- the N array substrate row drive circuits 10 arranged in cascade are all arranged on the first side; and
- the N auxiliary circuits 20 are all arranged on the second side.

Further, the display panel 210 includes:
- a pixel array 210, including N rows of sub-pixels, where each row of sub-pixels is connected to one of the N array substrate row drive circuits 10 and one of the N auxiliary circuits 20.

In this embodiment, the array substrate row drive circuit 10 is arranged on one side of the display panel and controls the sub-pixels to be turned on row by row to realize unilateral driving. The auxiliary circuit 20 is arranged on the other side, that is, the array substrate row drive circuit 10 and the auxiliary circuit 20 are separately arranged on both sides of the display panel, so that the array substrate row drive circuit 10 and the auxiliary circuit 20 that drive the same row of sub-pixels are separately arranged on both sides of the display panel, so that the driving current can flow from two ends to the middle area to drive the entire row of sub-pixels to charge. Since the auxiliary circuit 20 can charge the far-end sub-pixels, it can compensate for the unsaturated charging voltage of the far-end sub-pixels due to insufficient driving force of the near-end array substrate row drive circuit 10, thereby ensuring that each sub-pixel can be fully charged.

Figure 6:
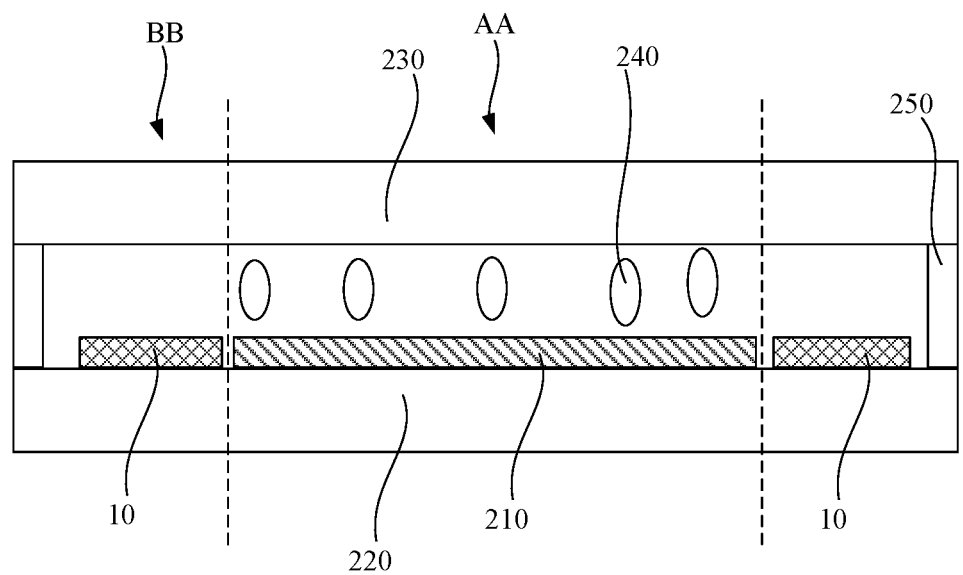
FIG. 6 is a schematic structural diagram of a display panel according to an embodiment of the present disclosure.
Figure 7:
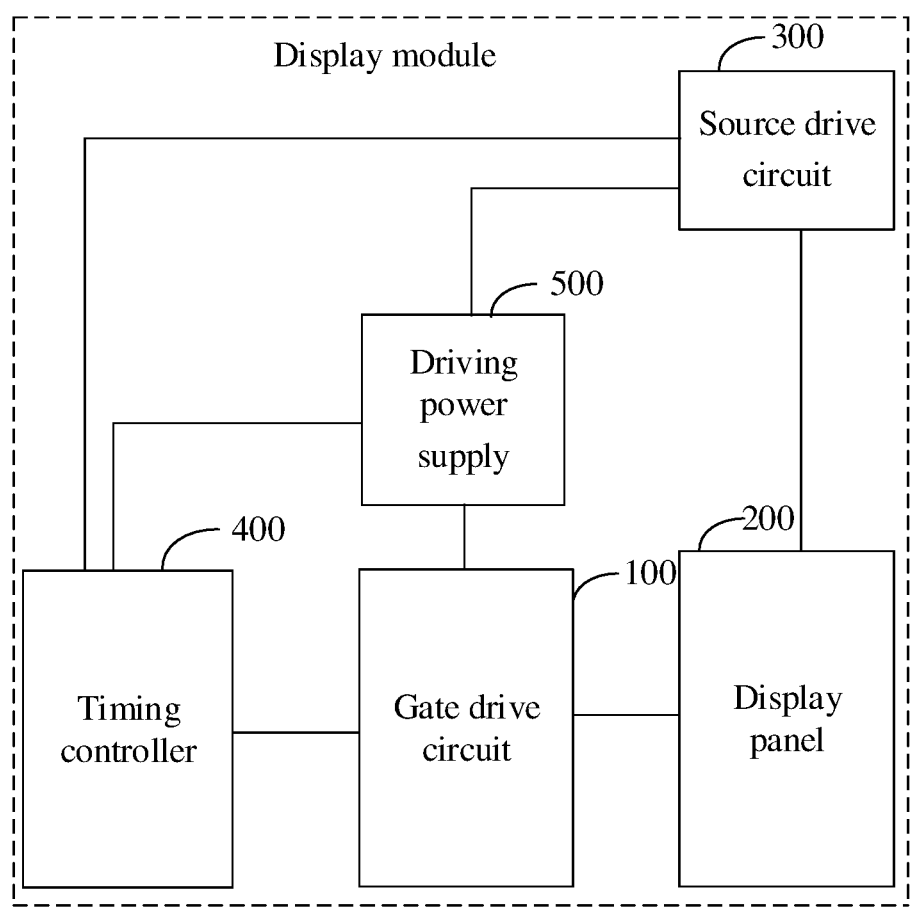
FIG. 7 is a schematic diagram of a circuit structure of the display module according to an embodiment of the present disclosure.

Referring to FIG. 6, in an embodiment, the display panel 200 further includes:
- a first substrate 220, including a display area AA and a surrounding area, that is, a non-display area BB, where the pixel array 210 is arranged in the display area AA of the first substrate 220, and the N array substrate row drive circuits 10 arranged in cascade and the N auxiliary circuits 20 are arranged in the non-display area BB of the first substrate 220;
- a second substrate 230, arranged opposite to the first substrate 220; and
- a liquid crystal layer 240, arranged between the first substrate 220 and the second substrate 230 and including liquid crystal molecules, where the pixel array 210 is configured for controlling actions of the liquid crystal molecules.

In this embodiment, the first substrate 220 and the second substrate 230 are usually both transparent material substrates such as glass substrates or plastic substrates. The second substrate 230 is disposed opposite to the first substrate 220, and a corresponding circuit may be disposed between the first substrate 220 and the second substrate 230. The first substrate 220 is an array substrate, the second substrate 230 is a color filter substrate, and the first substrate 220 and the second substrate 230 may be flexible transparent substrates.

The pixel array 210 is arranged on the first substrate 220 and located in the display area AA. The pixel array 210 can generate control signals to control the display of the display panel 200 under the driving control of the array substrate row drive circuit 10.

The array substrate row drive circuits 10 are arranged on the first substrate 220 and located in the non-display area BB. Accordingly, the array substrate row drive circuits 10 can realize the isolation between the array substrate row drive circuits 10 and the liquid crystal layer 240 through an isolation structure, so that the array substrate row drive circuits 10 and the second substrate 230 form liquid crystal-free areas.

It can be understood that, in the above embodiment, the display panel 200 further includes a sealant 250 arranged in a non-display area BB between the first substrate 220 and the second substrate 230 and surrounding the liquid crystal layer 240, where the N array substrate row drive circuits 10 are located between the sealant 250 and the display area AA. The sealant 250 may be coated on the first substrate 220 or the second substrate 230 to connect the first substrate 220 and the second substrate 230, so as to realize the assembly process of the display panel 200. Specifically, the pixel array 210 has a Half Source Driving (HSD) architecture.

Referring to FIG. 5, in an embodiment, the pixel array 210 includes multiple sub-pixels, each sub-pixel includes an active switch (TFT) and a pixel capacitor. A gate of the active switch is electrically connected to a gate line corresponding to the sub-pixel, a source of the active switch is electrically connected to a data line corresponding to the pixel circuit, and a drain of the active switch is electrically connected to the pixel capacitor of the sub-pixel. The pixel array 210 further includes a pixel capacitor array connected to the active switching element array.

The display panel 200 includes multiple pixels, and each pixel includes three sub-pixels of red, green and blue. Each sub-pixel circuit structure is generally provided with a TFT and a pixel capacitor. A gate of the TFT is connected to a gate driver through a gate line, a source of the TFT is connected to the source drive circuit 300 through a data line, and a drain of the TFT is connected to one end of the pixel capacitor. Multiple TFTs constitute the TFT array of this embodiment (not shown in the figure). The TFTs located in the same column are connected to the source drive circuit 300 through a data line, and the TFTs located in the same row are connected to the gate driver through a gate line, thus forming a TFT array. The array substrate row drive circuits 10 provide voltages to the gates of several TFTs. These TFTs can be a-Si (non-silicon) TFTs or Poly-Si (polysilicon) TFTs, and the Poly-Si TFTs can be formed by using Low Temperature Poly-Silicon (LTPS) technology.

The present disclosure further provides a display device, which includes the gate drive circuit as described above, or includes the display module as described above. For the detailed structure of the display module and the gate drive circuit, please refer to the above-mentioned embodiments, which will not be repeated here. It is understandable that since the above-mentioned display module and the gate drive circuit is included in the display device of this disclosure, the embodiments of the display device of this disclosure includes all the technical solutions of the above-mentioned display module and gate drive circuit, and the achieved technical effects are also completely the same, which will not be repeated here.

The above are only the preferred embodiments of this disclosure, and therefore do not limit the patent scope of this disclosure. Under the conception of this disclosure, any equivalent structural transformation made by using the content of the description and drawings of this disclosure, or direct/indirect application in other related technical fields are all included in the patent protection scope of this disclosure.

What is claimed is:

1. A gate drive circuit, comprising:
    N array substrate row drive circuits arranged in cascade, wherein each array substrate row drive circuit comprises a signal input terminal, a pull-up control signal terminal and a gate drive signal output terminal, and an Nth array substrate row drive circuit is configured for outputting an Nth gate drive signal in response to a signal input terminal of the Nth array substrate row drive circuit receiving a gate drive signal output by an (N−1)th array substrate row drive circuit to control Nth sub-pixels to charge; and
    N auxiliary circuits, wherein each auxiliary circuit is arranged corresponding to one of the N array substrate row drive circuits, and each auxiliary circuit comprises a timing signal input terminal, a controlled terminal and an output terminal, wherein:
    a timing signal input terminal of an Nth auxiliary circuit is connected to an Nth timing control signal, a controlled terminal of the Nth auxiliary circuit is connected to a pull-up control signal terminal of the (N−1)th array substrate row drive circuit, and an output terminal of the Nth auxiliary circuit is connected to a gate drive signal output terminal of the Nth array substrate row drive circuit; and
    the Nth auxiliary circuit is configured for controlling the Nth sub-pixels to charge in a determination that the Nth timing control signal connected to the timing signal input terminal of the Nth auxiliary circuit and an (N−1)th pull-up control signal connected to the controlled terminal of the Nth auxiliary circuit are both high level, wherein N is an integer and greater than 1.

2. The gate drive circuit of claim 1, wherein each auxiliary circuit comprises a first active switch, a controlled terminal of the first active switch is the controlled terminal of the each auxiliary circuit, an input terminal of the first active switch is the timing signal input terminal of the each auxiliary circuit, and an output terminal of the first active switch is the output terminal of the each auxiliary circuit.

3. The gate drive circuit of claim 1, wherein each array substrate row drive circuit comprises a charge circuit, a reset circuit and an output circuit, an input terminal of the charge circuit is the signal input terminal of the each array substrate row drive circuit, an output terminal of the charge circuit is the pull-up control signal terminal of the each array substrate row drive circuit and is connected to a controlled terminal of the output circuit, an input terminal of the output circuit is connected to a timing signal for the each array substrate row drive circuit, and an output terminal of the output circuit is the gate drive signal output terminal of the each array substrate row drive circuit.

4. A display module, comprising:
    a display panel; and
    the gate drive circuit as recited in claim 1, wherein the N array substrate row drive circuits arranged in cascade and the N auxiliary circuits are correspondingly arranged on at least one side of the display panel.

5. The display module of claim 4, wherein each auxiliary circuit comprises a first active switch, a controlled terminal of the first active switch is the controlled terminal of the each auxiliary circuit, an input terminal of the first active switch is the timing signal input terminal of the each auxiliary circuit, and an output terminal of the first active switch is the output terminal of the each auxiliary circuit.

6. The display module of claim 5, wherein each array substrate row drive circuit comprises a charge circuit, a reset circuit and an output circuit, an input terminal of the charge circuit is the signal input terminal of the each array substrate row drive circuit, an output terminal of the charge circuit is the pull-up control signal terminal of the each array substrate row drive circuit and is connected to a controlled terminal of the output circuit, an input terminal of the output circuit is connected to a current-level timing signal, and an output terminal of the output circuit is the gate drive signal output terminal of the each array substrate row drive circuit.

7. The display module of claim 4, comprising a first side and a second side arranged oppositely,
    wherein the N array substrate row drive circuits arranged in cascade and the N auxiliary circuits are both arranged on the first side and the second side.

8. The display module of claim 7, comprising
    a pixel array comprising odd-numbered rows of sub-pixels and even-numbered rows of sub-pixels, wherein:
each odd-numbered row of sub-pixels is connected to one of the N array substrate row drive circuits arranged on the first side and one of the N auxiliary circuits arranged on the second side; and
each even-numbered row of sub-pixels is connected to one of the N array substrate row drive circuits arranged on the second side and one of the N auxiliary circuits arranged on the first side.

9. The display module of claim 8, further comprising:
a first substrate, comprising a display area and a non-display area, wherein the pixel array is arranged in the display area of the first substrate, and the N array substrate row drive circuits arranged in cascade and the N auxiliary circuits are arranged in the non-display area of the first substrate;
a second substrate, arranged opposite to the first substrate; and
a liquid crystal layer, arranged between the first substrate and the second substrate and comprising liquid crystal molecules, wherein the pixel array is configured for controlling actions of the liquid crystal molecules.

10. The display module of claim 9, further comprising a sealant arranged in a non-display area between the first substrate and the second substrate and surrounding the liquid crystal layer, wherein the N array substrate row drive circuits are located between the sealant and the display area.

11. The display module of claim 9, wherein the first substrate and the second substrate are both glass substrates or plastic substrates.

12. The display module of claim 11, wherein the first substrate is an array substrate, and the second substrate is a color filter substrate.

13. The display module of claim 4, comprising a first side and a second side arranged oppositely, wherein:
the N array substrate row drive circuits arranged in cascade are all arranged on the first side; and
the N auxiliary circuits are all arranged on the second side.

14. The display module of claim 13, comprising
a pixel array comprising N rows of sub-pixels, wherein each row of sub-pixels is connected to one of the N array substrate row drive circuits and one of the N auxiliary circuits.

15. The display module of claim 4, further comprising a source drive circuit and data lines, wherein output terminals of the source drive circuit are connected to the pixel array of the display panel through the data lines.

16. The display module of claim 15, wherein the pixel array comprises a plurality of sub-pixels, each sub-pixel comprises three sub-pixels of red, green, and blue colors, gates of sub-pixels located in a same row are connected to an array substrate row drive circuit of a same level through a gate line, and sources of sub-pixels located in a same column are connected to the source drive circuit through one of the data lines.

17. The display module of claim 4, further comprising a timing controller and a driving power supply, wherein the timing controller is connected to the source drive circuit, and an output terminal of the driving power supply is connected to the N array substrate row drive circuits and the source drive circuit.

18. The display module of claim 17, wherein the sealant is coated on the first substrate or the second substrate.

19. A display device, comprising the display module as recited in claim 4.

20. A display device, comprising the gate drive circuit as recited in claim 1.

* * * * *